US008443363B1

(12) United States Patent
Brennan, III et al.

(10) Patent No.: US 8,443,363 B1
(45) Date of Patent: May 14, 2013

(54) COORDINATED VIRTUALIZATION ACTIVITIES

(75) Inventors: James E. Brennan, III, Rancho Palos Verdes, CA (US); James Waggoner, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1106 days.

(21) Appl. No.: 12/130,306

(22) Filed: May 30, 2008

(51) Int. Cl.
*G06F 9/455* (2006.01)

(52) U.S. Cl.
USPC .............. 718/1; 718/104; 718/105; 718/107; 711/147

(58) Field of Classification Search .................. None
See application file for complete search history.

(56) References Cited

U.S. PATENT DOCUMENTS

| | | | |
|---|---|---|---|
| 7,089,377 B1* | 8/2006 | Chen .............................. 711/147 |
| 2002/0087611 A1* | 7/2002 | Tanaka et al. ...................... 709/1 |
| 2004/0148420 A1* | 7/2004 | Hinshaw et al. ............... 709/231 |
| 2006/0136720 A1 | 6/2006 | Armstrong et al. |
| 2006/0184937 A1* | 8/2006 | Abels et al. ........................ 718/1 |
| 2006/0200819 A1* | 9/2006 | Cherkasova et al. .............. 718/1 |
| 2007/0028244 A1* | 2/2007 | Landis et al. .................. 718/108 |
| 2007/0101334 A1* | 5/2007 | Atyam et al. .................. 718/102 |
| 2008/0066070 A1* | 3/2008 | Markov ......................... 718/103 |
| 2008/0082977 A1* | 4/2008 | Araujo et al. ...................... 718/1 |
| 2009/0113435 A1* | 4/2009 | Mizrachi et al. .............. 718/102 |

OTHER PUBLICATIONS

Geist, A. et al., "PVM: Parallel Virtual Machine: A Users' Guide and Tutorial for Network Parallel Computing," Nov. 8, 1994, The MIT Press, [Online Summary and User Reviews] [Retrieved on May 6, 2009] Available on the Internet at< URL:http://www.amazon.com/PVM-Computing-Scientific-Engineering-Computation/dp/0262571080/ref=cm_cr_pr_product_top.

* cited by examiner

*Primary Examiner* — Emerson Puente
*Assistant Examiner* — Dong Kim
(74) *Attorney, Agent, or Firm* — Fenwick & West LLP (57) ABSTRACT

A computer includes a plurality of activity modules in multiple virtual machines. An activity module performs an activity, such as malware detection, in a virtual machine. A monitoring module receives virtualized infrastructure information of the computer comprising a hardware configuration of the computer and a virtual machine configuration of the computer. A scheduling module determines, based on the virtualized infrastructure information, scheduling instructions for an activity module. A supervisor communication module causes the activity module to execute based on the scheduling instructions. The scheduling instructions minimize hardware resource conflicts between the activity module and the other activity modules of the computer.

17 Claims, 5 Drawing Sheets

COORDINATED VIRTUALIZATION ACTIVITIES

BACKGROUND

1. Field of the Invention

This invention pertains in general to protecting a computer from malicious software and in particular to techniques for coordinating applications in a virtualized environment.

2. Description of the Related Art

A virtual machine is a self-contained environment for running software. Several virtual machines are often executed on the same physical computer. By executing multiple virtual machines on the same computer, multiple computing environments can be provided at a lower cost than if the environments were run on separate computers. Virtual machines also provide other benefits, such as increased flexibility in partitioning computing resources among multiple computing environments.

Various types of virtualization technologies exist. In some cases, multiple virtual machines on a computer are run under a hypervisor, a virtual machine emulator. The hypervisor runs at a higher privilege level than the virtual machines and is generally capable of controlling the operation of the virtual machines. The operation of the hypervisor and the virtual machines can be assisted by virtualization support in the computer hardware. However, such support is not necessary. Each virtual machine has a separate thread of execution and may run its own operating system, enabling multiple operating systems to run on the same computer.

Applications may be run within the virtual machines. These can be anti-malware applications that protect the virtual machines from malware. For example, an anti-virus scanning program may be run within a virtual machine to detect and remove viruses in the virtual machine environment. These anti-malware applications use real resources of the computer, such as the computer's processor, disk drives, and network interfaces.

An application running within one virtual machine generally is not aware of applications running within another virtual machine. As a result, applications running in different virtual machines can cause resource conflicts on the computer, possibly degrading the performance of the computer (and affecting all virtual machines running on the computer) or causing the applications to fail. For example, several virtual machines on a computer may have virus scan programs scheduled to automatically run at 3:00 AM every day, causing the computer's real processor and hard disk to become overloaded at the scheduled time. Therefore, there is a need in the art for a way to coordinate applications running in different virtual machines on a computer.

BRIEF SUMMARY OF THE INVENTION

The above need is met by a system, method, and computer program product for coordinating the execution of a plurality of activity modules in multiple virtual machines of a computer. An activity module performs an activity, such as malware detection, in a virtual machine of the computer. In an embodiment of the system and computer program product, a monitoring module receives virtualized infrastructure information of the computer comprising a hardware configuration of the computer and a virtual machine configuration of the computer. A scheduling module determines, based on the virtualized infrastructure information, scheduling instructions for an activity module. A supervisor communication module causes the activity module to execute based on the scheduling instructions. The scheduling instructions minimize hardware resource conflicts between the activity module and the other activity modules of the computer.

In an embodiment of the method, a computer-implemented method of coordinating the execution of a plurality of activity modules in multiple virtual machines of a computer comprises receiving virtualized infrastructure information of the computer. The virtualized infrastructure information includes a hardware configuration of the computer and a virtual machine configuration of the computer. Scheduling instructions for an activity module are determined based on the virtualized infrastructure information, and the activity module is executed based on the scheduling instructions.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

Figure 1:
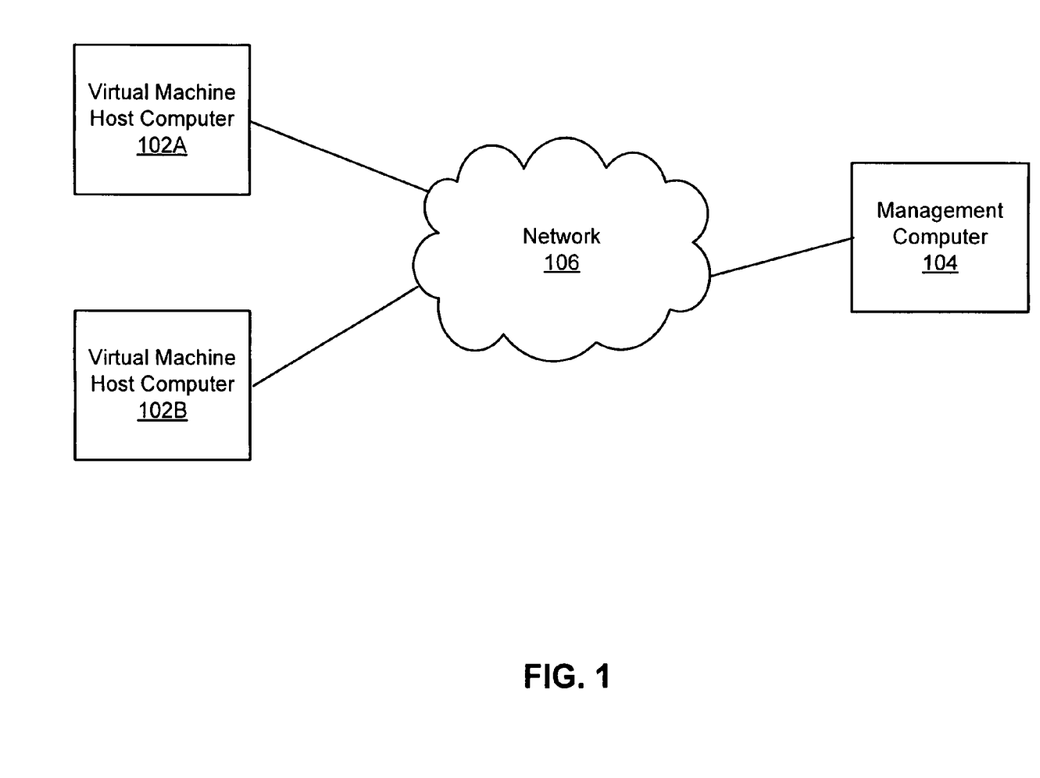
FIG. 1 is a high-level diagram illustrating a networked environment that includes a management computer that can coordinate applications on virtual machine (VM) host computers, in one embodiment.

FIG. 1 is a high-level diagram illustrating a networked environment 100 that includes a management computer 104 that can coordinate applications on virtual machine (VM) host computers 102, in one embodiment. The management computer 104 and the VM host computers 102 are connected by a network 106. The VM host computers 102 each run multiple virtual machines, and some of the virtual machines execute anti-malware applications. The management computer 104 runs a supervisor process that communicates with the applications to coordinate their execution so that hardware resource conflicts on the VM host computers 102 are avoided. As further described below, the supervisor process does not need to run on a management computer 104, but can instead be run on the VM host computer 102 that contains the applications that the supervisor process is coordinating.

Figure 2:
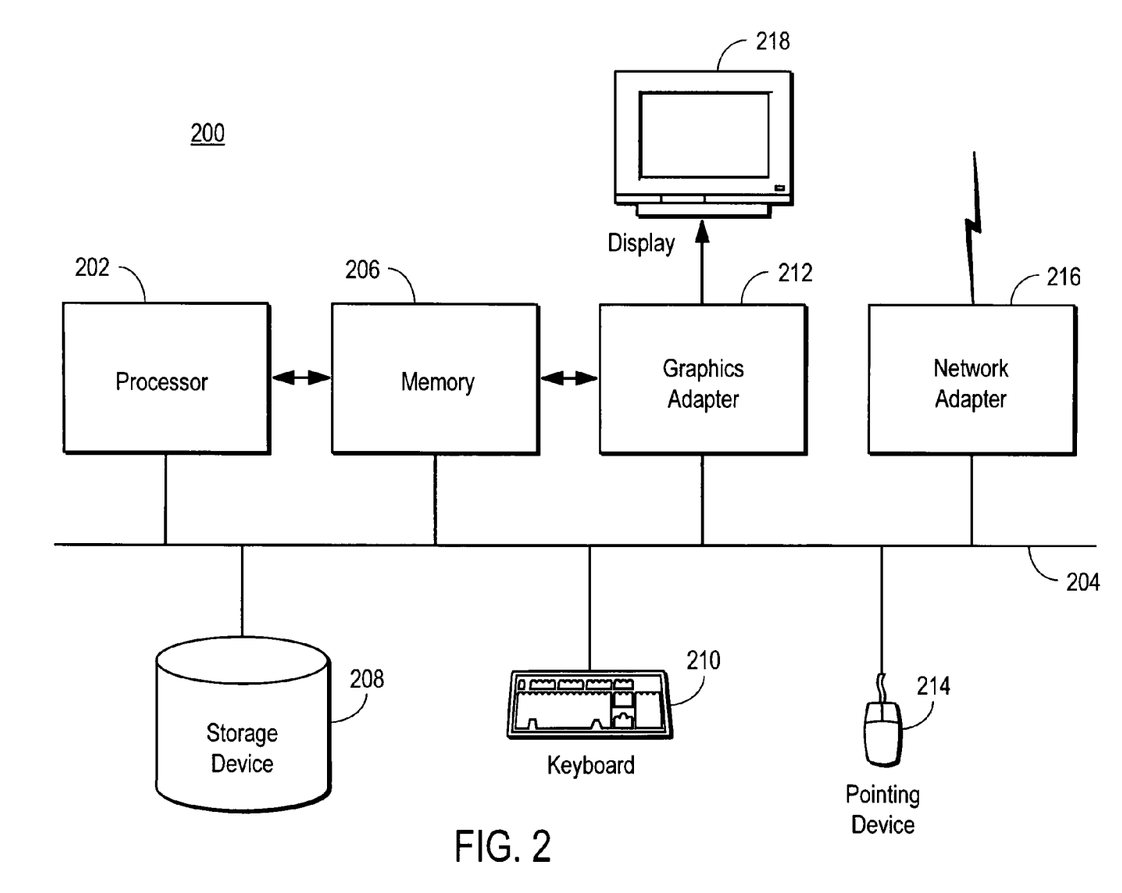
FIG. 2 is a block diagram illustrating a computer that can serve as an embodiment of a VM host computer or a management computer, in one embodiment.

FIG. 2 is a block diagram illustrating a computer 200 that can serve as an embodiment of a VM host computer 102 or a management computer 104. Illustrated are at least one processor 202 coupled to a bus 204. Also coupled to the bus are a memory 206, a storage device 208, a keyboard 210, a graphics adapter 212, a pointing device 214, and a network adapter 216. A display 218 is coupled to the graphics adapter 212. The storage device 208 is a device such as a hard drive, CD or DVD drive, or flash memory device, and holds files containing executable code and/or data utilized during the operation of the computer 200. The memory 206, in one embodiment, is a random access memory (RAM) and holds instructions and data loaded from the storage device 208, generated during processing, and/or from other sources.

Computers acting in different roles may have different and/or additional elements than the ones shown in FIG. 2. For example, a computer 200 acting as a VM host computer 102 may have a processor 202 with virtualization support. Likewise, a computer 200 acting as a VM host computer 102 or a management computer 104 may lack devices such as a display 218 and/or keyboard 210 that are not necessarily required to operate it.

The computer 200 executes one or more operating systems such as a variant of MICROSOFT WINDOWS or LINUX. In general, the operating system executes one or more application programs. The operating system and application programs executed by the computer are formed of one or more processes. This description utilizes the term "module" to refer to computer program logic for providing a specified functionality. A module can be implemented in hardware, firmware, and/or software. A module is typically stored on the storage device 208, loaded into the memory 206, and executed by the processor 202. A module can include one or more processes, and/or be provided by only part of a process.

Figure 3:
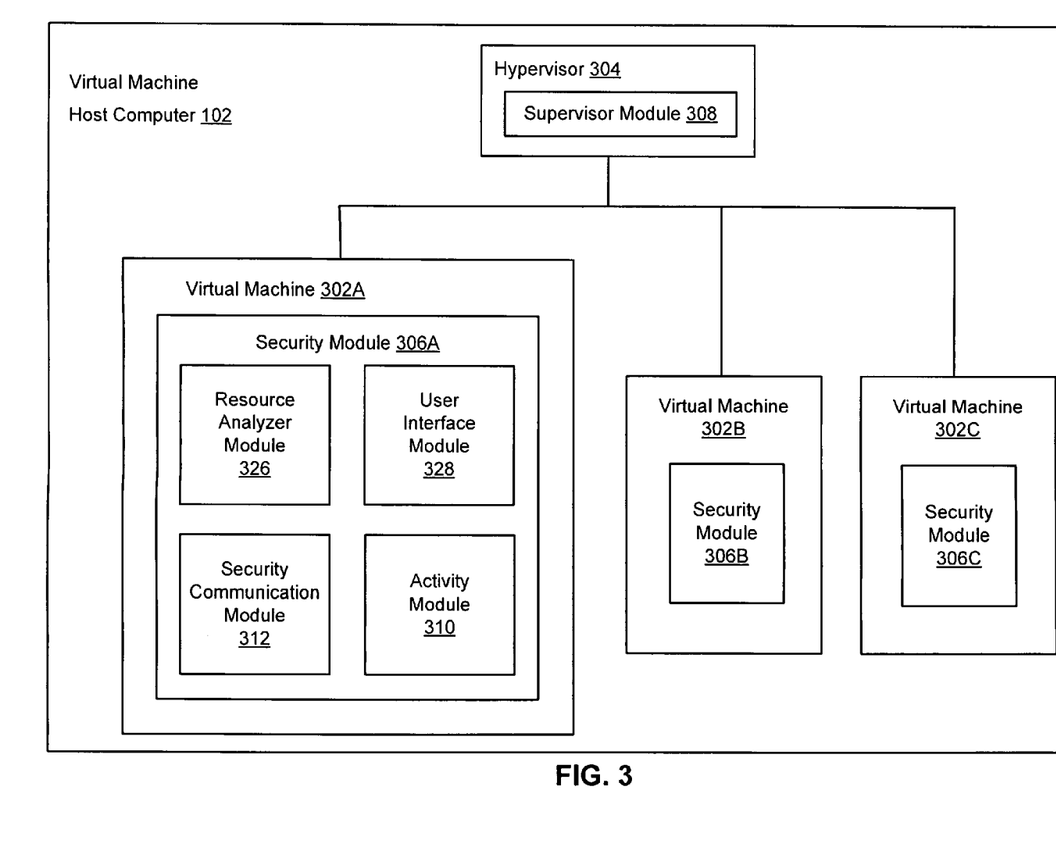
FIG. 3 illustrates a logical view of a computing environment provided by the virtual machine host computer for coordinating applications in a virtualized environment, in one embodiment.

FIG. 3 illustrates a logical view of a computing environment provided by the virtual machine host computer 102 for coordinating applications in a virtualized environment, in one embodiment. The environment 300 includes a plurality of virtual machines 302. As mentioned above, these virtual machines 302 run on a VM host computer 102. The virtual machines 302 can be controlled by a hypervisor 304, though a hypervisor is not required. The environment 300 further includes a supervisor module 308 for coordinating activities, such as applications and processes, in the virtual machines 302. Other embodiments can have different and/or additional entities. In addition, the functionalities can be distributed among the entities in a different manner than is described above. For example, the supervisor module 308 may run in a virtual machine 302 or outside of the VM host computer 102 on the management computer 104.

A virtual machine 302 is a self-contained environment for running software. Each virtual machine 302 has a separate thread of execution and may run its own operating system, enabling multiple operating systems to run on the same VM host computer 102. In some cases, multiple virtual machines 302 on a VM host computer 102 are run under a hypervisor 304, a virtual machine emulator.

A virtual machine 302 executes one or more security modules 306. The security module 306 may execute within an operating system running in the virtual machine 302. The security module 306 protects the virtual machine 302 from malware such as viruses and worms and performs other tasks for the virtual machine. The security module 306 includes an activity module 310 for performing an activity of the security module, such as detecting malware and taking remedial action if malware is detected. For example, the activity module 310 can be a virus scanning process or application that scans the virtual machine 302 for viruses, including scanning a portion of the storage device 208 of the VM host computer 102 on which the virtual machine 302 is located. The activity module 310 may also perform various other tasks not necessarily directly related to system security or malware detection.

In general, the activity module 310 uses hardware resources of the VM host computer 102 on which it is running. These resources include processing cycles of the processor 202, and input/output (I/O) bandwidth to read and write to the storage device 208. The activity module 310 may also use I/O bandwidth to communicate with the network adapter 216. As mentioned above, there are often multiple activity modules 310 running in multiple virtual machines 302 on a VM host computer 102. The activity module 310 may be unaware of the resource consumption of these other activity modules 310 or the resource consumption of other software running in the virtual machines 302 on the VM host computer 102.

The hardware resources of the VM host computer 102 mentioned above are limited. If the capacity of these resources is exceeded by multiple activity modules 310 operating simultaneously, the activity modules may fail or their performance may decrease significantly. For example, suppose that an activity module 310 operating in one virtual machine 302 performs a virus scan of a portion of the storage device 208 that takes one hour if the VM host computer 102 is otherwise idle. Similarly, another activity module 310 in another virtual machine 302 also takes an hour under the same conditions. If both activity modules 310 execute simultaneously and make requests that together exceed the available 110 bandwidth of the storage device 208 of the VM host computer 102, the running time of the modules may be greater than the two hours total time the scans would have taken if run separately. This can occur because the storage device 208 operates less efficiently when overloaded (e.g., it must queue requests, send error messages, or handle retries). Other activities on the VM host computer 102, such as user applications running in other virtual machines 302, will also be negatively affected.

The supervisor module 308 schedules the execution of the various activity modules 310 such that the activity modules do not overload the resources of the VM host computer 102. In the embodiment illustrated in FIG. 3, the supervisor module 308 runs in the hypervisor 304 on the VM host computer 102. The supervisor module may also run in one of the virtual machines 302. If the supervisor module 308 runs on the VM host computer 102, a separate management computer 104 is not necessary.

In another embodiment, the supervisor module 308 runs on the management computer 104. In this case, the supervisor module 308 communicates over the network 106 with security modules 306 running on one or more VM host computers 102. A single supervisor module 308 communicates with multiple security modules 306 in order to coordinate the execution of the activity modules 310 within the security modules. A supervisor module 308 can manage security modules 306 on multiple VM host computers 102. In this case, the supervisor module 308 schedules the execution of the activity modules 310 to prevent overloading the resources of each VM host computer 102.

Figure 4:
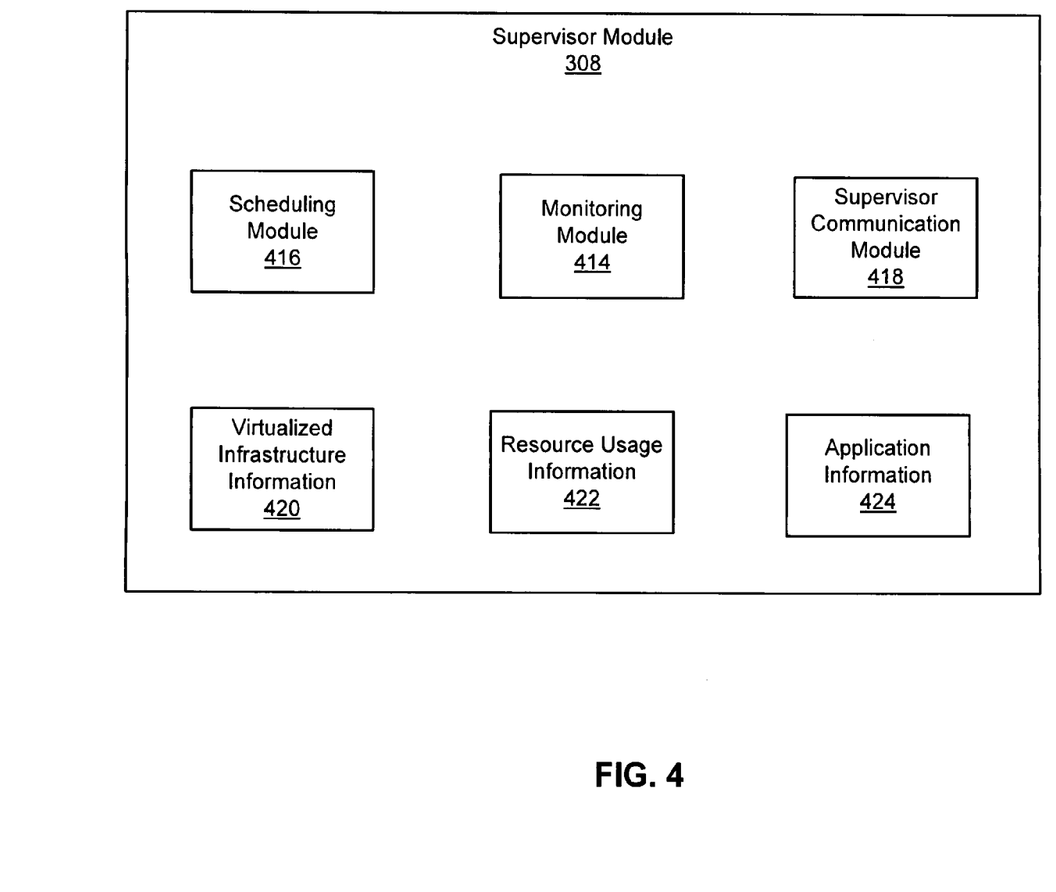
FIG. 4 is a block diagram illustrating the supervisor module, in one embodiment.

FIG. 4 is a block diagram illustrating the supervisor module, in one embodiment. The supervisor module 308 includes a monitoring module 414, a scheduling module 416, and a supervisor communication module 418. The monitoring module 414 obtains information about the VM host computer 102 and the virtual machines 302 and applications such as activity modules 310 running on the virtual machines. The scheduling module 416 schedules activity modules 310 to run based on requests received from security modules 306 and information obtained by the monitoring module 414. The supervisor communication module 418 handles communication with the security modules 306.

The monitoring module 414 obtains various types of information about the VM host computer 102 to enable the scheduling module 416 to schedule the execution of activity modules 310. One type of information obtained is the virtualized infrastructure information 420. This includes information about the physical hardware of the VM host computer 102, such as the number of processors 202 and the processing capacity of the processors. It also includes information about the I/O subsystems and communication bandwidths to the storage devices 208 and network adapters 216. The virtualized infrastructure information 420 also includes information about the configuration of the virtual machines 302, such as the number of virtual machines and the hardware resources allocated to each. For example, if the VM host computer 102 has multiple processors 202, the virtualized infrastructure information 420 can include a mapping describing which processors are used by which virtual machines 302.

The virtualized infrastructure information 420 is not necessarily static, as the hardware configuration can change and the mapping of the virtual machines 302 to the hardware can change. However, this generally happens infrequently. In one embodiment, the virtualized infrastructure information 420 is obtained by manual input to the supervisor module 308 or by the supervisor module querying an interface of the VM host computer 102 that provides configuration information. The information is updated periodically and stored in the supervisor module 308.

The monitoring module 414 also obtains resource usage information 422. This information describes the resources currently being used or expected to be used in the near future by applications running in the virtual machines 302. For example, the resource usage information 422 may indicate that two virtual machines 302 are currently each using 40% of the available processing cycles of the VM host computer 102. This information can be obtained by periodically querying interfaces of the VM host computer 102 and virtual machines 302 that provide information such as the system status and current resource load. In one embodiment, the information is stored in the supervisor module 308.

In one embodiment, the monitoring module 414 also obtains and manages application information 424. This information describes the characteristics of the various activity modules 310 such as the processing power, storage device access bandwidth, and other resource requirements of each of the activity modules. The scheduling module 416 uses this information when deciding when to allow the activity modules 310 to execute. The application information 424 can be indexed by the name or other identifier of each activity module 310 to enable easy retrieval of the resource requirements of a given activity module.

In one embodiment, the application information 424 is manually entered and updated as necessary. The information may also be obtained by communicating with the various security modules 306 through the supervisor communication module 418. In this case, the supervisor communication module 418 communicates with the security communication module 312 of a security module 306 to obtain information about the activity module 310 of the security module. In one embodiment, a resource analyzer module 326 in the security module 306 determines the resource usage of the activity module 310. It can do this by observing the execution of the activity module 310 and collecting data regarding the various hardware resources used by the activity module. This information can then be provided to the monitoring module 414 through the security communication module 312.

The scheduling module 416 schedules activity modules 310 to execute based on information obtained by the monitoring module 414. In one embodiment, a security modules 306 sends a request to execute an activity module 310 to the supervisor module 308. The request is sent from the security communication module 312 of the security module 306 to the supervisor communication module 418 of the supervisor module 308. The request is passed to the scheduling module 416, which determines when the activity module 310 should execute. The scheduling module 416 may maintain a queue of activity modules 310 currently requesting execution. The scheduling instructions are then sent to the security module 306 and the security module starts execution of the activity module 310 based on the scheduling instructions. The scheduling instructions may include an optimal execution start time for the activity module.

In one embodiment, the security modules 306 do not send requests to execute activity modules 310 to the supervisor module 308, but instead the supervisor module already has information about the desired execution times of the activity modules. This information can be included in the application information 424. For example, the application information 424 may indicate that a particular activity module 310 should ideally be run once every hour. As a result, the scheduling module 416 attempts to execute the activity module 310 every hour. When the scheduling module 416 determines that the activity module 310 can start executing, the supervisor communication module 418 notifies the security module 306 to start executing the activity module 310.

The scheduling module 416 uses the virtualized infrastructure information 420, the resource usage information 422, and the application information 424 when determining when to schedule an activity module 310 for execution. The scheduling module 416 schedules execution of an activity module 310 to avoid hardware resource conflicts that can result in degraded system performance or failure as described above. For example, suppose that two security modules 306 request permission to execute their activity modules 310, and both activity modules require heavy use of I/O pathways to storage devices 208. If the scheduling module 416 determines that the virtual machines 302 on which the two activity modules 310 are running are mapped to two different storage devices 208 and the I/O pathways are separate, the scheduling module can allow both modules to run simultaneously because there would not be a hardware conflict. The scheduling module 416 sometimes may not be able to schedule all activity modules 310 to avoid hardware resource conflicts. In such cases, the scheduling module 416 schedules the activity modules 310 to minimize hardware resource conflicts.

Generally, the scheduling module 416 uses the virtualized infrastructure information 420 to determine the hardware capabilities of the VM host computer 102 and the configuration of the virtual machines 302. The scheduling module uses the resource usage information 422 to determine the current resource usage, and uses the application information 424 to determine the additional resources that will be used by running an activity module 310. If the scheduling module 416 determines that an activity module 310 cannot run immediately and must be delayed to a later time, the supervisor module 308 communicates this to the security module 306 through the supervisor communication module 418. The supervisor module 308 can either communicate the optimal time that the activity module 310 should start executing, or the supervisor module can inform the security module 306 that it will send another message when it determines that the activity module can start executing.

In some cases, an activity module 310 requires a deterministic amount of resources and has a deterministic end time that is provided to the scheduling module 416 through the application information 424. However, in other cases, the required hardware resources and execution time of an activity module 310 is not known in advance. In these cases, the scheduling module may request an update from the security module 306 when the activity module 310 has completed execution. Upon receiving an update from the security module 306 that execution has completed, the scheduling module 416 can schedule other activity modules 310 with currently outstanding requests for execution.

In one embodiment, the security module 306 includes a user interface module 328 for interacting with a user of the VM host computer 102 through, for example, a display 218, keyboard 210, and pointing device 214. In some cases, the user desires an activity module 310 to execute at a certain time. The user can input a desired execution schedule through the user interface module 328. For example, the user may specify that a virus scan be run every day at 10:00 PM. The security module 306 then requests execution of the virus scan every day at 10:00 PM. If the scheduling module 416 needs to delay the virus scan on a particular day, information regarding the delay can be displayed to the user through the user interface module 328.

Figure 5:
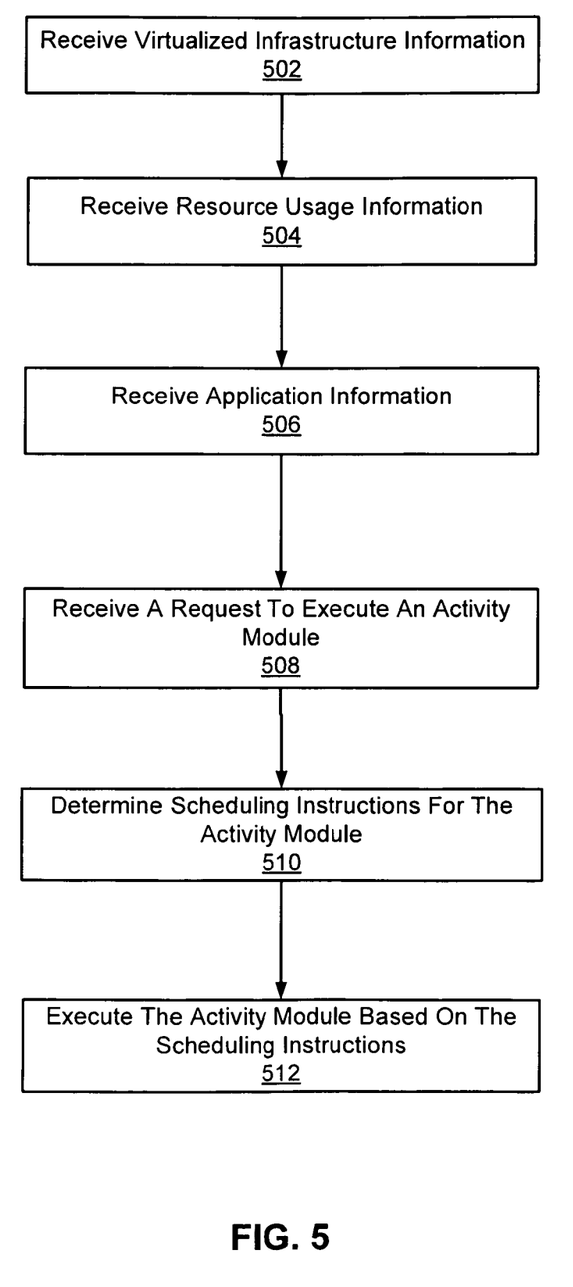
FIG. 5 is a flowchart illustrating the operation of the supervisor module, in one embodiment.

FIG. 5 is a flowchart illustrating the operation of the supervisor module 308 according to one embodiment. The supervisor module 308 receives 502 the virtualized infrastructure information 420, receives 504 the resource usage information 422, and receives 506 the application information 424. These types of information can be obtained periodically by the monitoring module 414. The supervisor module 308 receives 508 a request to execute an activity module 310. This request is received from the security communication module 312 of the security module 306 that includes the activity module 310. In one embodiment, the supervisor module 308 already knows when the activity module 310 desires to execute based on the application information 424.

The scheduling module 416 determines 510 scheduling instructions for the activity module 310 based on the information described above. The supervisor module 308 then causes the activity module 310 to execute 512 based on the scheduling instructions.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A system for coordinating the execution of security modules within virtual machines of a computer comprising:
   a computer-readable storage medium storing executable computer program modules comprising:
      a monitoring module for receiving virtualized infrastructure information of the computer mapping resources of the virtual machines to physical hardware components of the computer and application information describing resources of the virtual machines used by the execution of the security modules within the virtual machines, the physical hardware components comprising an input/output (I/O) pathway;
      a scheduling module for determining, based at least in part on the virtualized infrastructure information and the application information, scheduling instructions for the security modules that schedule executions of the security modules within the virtual machines to minimize simultaneous usage of the I/O pathway of the computer by the security modules; and
      a supervisor communication module for causing the security modules to execute based at least in part on the scheduling instructions.

2. The system of claim 1, wherein the monitoring module is configured for receiving resource usage information of the computer comprising current usage of physical hardware components of the computer, and wherein the scheduling instructions are determined based at least in part on the resource usage information.

3. The system of claim 1, wherein the application information describes physical hardware components expected to be used by the executions of the security modules.

4. The system of claim 1, wherein the scheduling instructions comprise optimal execution start times for the security modules.

5. The system of claim 1, wherein the supervisor module is configured for sending the scheduling instructions to a remote computer, and wherein the security modules are configured for executing on the remote computer.

6. The system of claim 1, wherein a security module is configured to receive the scheduling instructions and to execute based at least in part on the scheduling instructions in order to provide security in the virtual machine in which the security module resides.

7. The system of claim 1, wherein the scheduling module is configured for receiving a desired execution time of a security module and for determining the scheduling instructions based at least in part on the desired execution time.

8. The system of claim 1, wherein the scheduling instructions are determined in part by a queue of activation requests from one or more security modules.

9. The system of claim 1, wherein the application information additionally comprises a desired execution schedule for one or more security modules.

10. The system of claim 1, wherein the scheduling instructions schedule executions of the security modules to minimize simultaneous usage of the I/O pathway that would overload a capacity of the I/O pathway.

11. A computer program product having a non-transitory computer-readable storage medium having executable computer program instructions recorded thereon for coordinating the execution of security modules within virtual machines of a computer, comprising:
   a monitoring module for receiving virtualized infrastructure information of the computer mapping resources of the virtual machines to physical hardware components of the computer and application information describing resources of the virtual machines used by the execution of the security modules within the virtual machines, the physical hardware components comprising an input/output (I/O) pathway;
   a scheduling module for determining, based at least in part on the virtualized infrastructure information and the application information, scheduling instructions for the security modules that schedule executions of the security modules within the virtual machines to minimize simultaneous usage of the I/O pathway of the computer by the security modules; and
   a supervisor communication module for causing the security modules to execute based at least in part on the scheduling instructions.

12. The computer program product of claim 11, wherein the monitoring module is configured for receiving resource usage information of the computer comprising current usage of physical hardware components of the computer, and wherein the scheduling instructions are determined based at least in part on the resource usage information.

13. The computer program product of claim 11, wherein the application information describes physical hardware components expected to be used by the executions of the security modules.

14. The computer program product of claim 11, wherein the scheduling instructions comprise optimal execution start times for the security modules.

15. A computer-implemented method for coordinating the execution of security modules within virtual machines of a computer, comprising:

receiving virtualized infrastructure information of the computer mapping resources of the virtual machines to physical hardware components of the computer and application information describing resources of the virtual machines used by the execution of the security modules within the virtual machines, the physical hardware components comprising an input/output (I/O) pathway;

determining, based at least in part on the virtualized infrastructure information and the application information, scheduling instructions for the security modules that schedule executions of the security modules within the virtual machines to minimize simultaneous usage of the I/O pathway of the computer by the security modules; and executing the security modules based at least in part on the scheduling instructions.

16. The computer-implemented method of claim 15, further comprising receiving resource usage information of the computer comprising current usage of physical hardware components of the computer, and wherein the scheduling instructions are determined based at least in part on the resource usage information.

17. The computer-implemented method of claim 15, wherein application information describes physical hardware components expected to be used by the executions of the security modules.

* * * * *